(12) United States Patent
Isoda et al.

(10) Patent No.: US 12,062,895 B2  
(45) Date of Patent: Aug. 13, 2024

(54) CABLE GUIDE AND WIRE HARNESS APPARATUS

(71) Applicant: SUMITOMO WIRING SYSTEMS, LTD., Mie (JP)

(72) Inventors: Kazuma Isoda, Mie (JP); Hiroshi Inoue, Mie (JP); Hiroki Uno, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 261 days.

(21) Appl. No.: 17/434,334

(22) PCT Filed: Dec. 17, 2019

(86) PCT No.: PCT/JP2019/049443  
§ 371 (c)(1),  
(2) Date: Aug. 26, 2021

(87) PCT Pub. No.: WO2020/174832  
PCT Pub. Date: Sep. 3, 2020

(65) Prior Publication Data  
US 2022/0173582 A1  Jun. 2, 2022

(30) Foreign Application Priority Data  
Feb. 28, 2019  (JP) ................. 2019-036773

(51) Int. Cl.  
  *H02G 3/06*  (2006.01)  
  *H02G 11/00*  (2006.01)

(52) U.S. Cl.  
  CPC .......... *H02G 3/0608* (2013.01); *H02G 11/00* (2013.01)

(58) Field of Classification Search  
CPC .... H02G 11/00; H02G 11/006; H02G 3/0475; H02G 3/0608; B60R 16/0215; F16G 13/16  
See application file for complete search history.

(56) References Cited

U.S. PATENT DOCUMENTS

| | | | |
|---|---|---|---|
| 6,065,278 A | 5/2000 | Weber et al. | |
| 6,387,002 B1 * | 5/2002 | Gunter | F16G 13/16 59/900 |

(Continued)

FOREIGN PATENT DOCUMENTS

| | | | |
|---|---|---|---|
| EP | 0308958 A2 * | 3/1989 | ............. F16G 13/06 |
| JP | H05-038035 A | 2/1993 | |

(Continued)

OTHER PUBLICATIONS

International Search Report issued on Mar. 17, 2020 for WO 2020/174832 A1 (4 pages).

*Primary Examiner* — Paresh Paghadal  
(74) *Attorney, Agent, or Firm* — Venjuris, P.C.

(57) ABSTRACT

A cable guide includes a plurality of link frame bodies arranged in a row and pivotably joined together, each of the link frame bodies including a pair of link plates 18 that are spaced apart from and opposed to each other in an orthogonal direction B that is orthogonal to an arrangement direction A, a first plate portion that joins together end portions of the pair of link plates on one side in a height direction C, and a second plate portion that joins together end portions on another side in the direction C, and at least one of two side edge portions of the first plate portion is provided with a notch portion 16 due to which a width of the first plate portion is smaller in a central portion in the direction B thereof than two end portions in the direction B of the first plate.

9 Claims, 12 Drawing Sheets

(56) References Cited

U.S. PATENT DOCUMENTS

| | | | |
|---|---|---|---|
| 2017/0066393 A1* | 3/2017 | Inoue | H02G 3/0437 |
| 2021/0181265 A1* | 6/2021 | Jaeker | G01L 19/00 |
| 2022/0090651 A1* | 3/2022 | Hermey | F16G 13/16 |
| 2022/0090652 A1* | 3/2022 | Theiss | F16G 13/16 |
| 2022/0140590 A1* | 5/2022 | Dommnik | F16G 13/16 |
| | | | 174/68.1 |
| 2022/0145964 A1* | 5/2022 | Hermey | F16G 13/16 |
| 2022/0170530 A1* | 6/2022 | Dommnik | H02G 11/006 |

FOREIGN PATENT DOCUMENTS

| | | | | |
|---|---|---|---|---|
| JP | H0538035 A | * | 3/1993 | H02G 11/00 |
| JP | 2001-221292 A | | 8/2001 | |
| JP | 2004-015929 A | | 1/2004 | |
| JP | 2010-179685 A | | 8/2010 | |
| JP | 2017-032018 A | | 2/2017 | |

* cited by examiner

CABLE GUIDE AND WIRE HARNESS APPARATUS

CROSS REFERENCE TO RELATED APPLICATIONS

This application is a national phase of PCT application No. PCT/JP2019/049443, filed on 17 Dec. 2019, which claims priority from Japanese patent application No. 2019-036773, filed on 28 Feb. 2019, all of which are incorporated herein by reference.

TECHNICAL FIELD

The present disclosure relates to a cable guide that houses and holds a wire harness that extends between a vehicle body and a movable body that is movably attached to the vehicle body, and a wire harness apparatus.

BACKGROUND

Patent Document 1 discloses a cable guide that is used covering a wire harness that extends between a vehicle body and a sliding door (movable body). This cable guide includes a plurality of link frame bodies having a hollow tubular shape and arranged in a row, and end portions of link frame bodies that are adjacent in the arrangement direction are pivotably joined to each other. Since the internal spaces of the plurality of link frame bodies joined together are continuous in the arrangement direction, an insertion path of the wire harness that extends in the longitudinal direction of the cable guide is formed.

Each of the link frame bodies of the cable guide includes a pair of link plates spaced apart from and opposed to each other in an orthogonal direction that is orthogonal to the arrangement direction of the plurality of link frame bodies. The pair of link plates are joined together by a pair of plate portions that respectively extend between end portions of the link plates on one side in the height direction and between end portions of the link plates on another side in the height direction. Accordingly, each link frame body is configured to have a hollow tubular shape formed by the pair of link plates and the pair of plate portions that are continuous in a circumferential direction.

PRIOR ART DOCUMENT

Patent Document

Patent Document 1: JP 2010-179685 A

SUMMARY OF THE INVENTION

Problems to be Solved

Incidentally, a wire harness that extends between a vehicle body and a movable body such as a sliding door includes a large number of electric wires such as a power supply line, a control signal line, and a sensor signal line in order to enable power supply to and control of electrical components provided in the movable body. Such electric wires have been loosely inserted into the insertion path of the cable guide with sufficient room. In recent years, as the functions of movable bodies improve, the number of electric wires that constitute a wire harness increases.

Room in the insertion path of the cable guide is limited due to an increase in the number of electric wires. The present inventors made a new finding in that, when the cable guide bends as the movable body moves, there are cases where the wire harness is likely to come into contact with a side edge of a plate portion of a link plate under high pressure, and be bent at a large bending angle.

In order to address such an issue, it is conceivable to increase the cross-section area of the insertion path of the cable guide and secure a large space in the insertion path, but this increases the size of the cable guide, and is far from being a preferable measure in terms of limitations of space in the vehicle. Furthermore, a significant change in the design and mold of the cable guide is required.

In view of this, an object of the present invention is to provide a cable guide that can reduce contact pressure of a wire harness acting on the cable guide without increasing the size of the cable guide, and a wire harness apparatus that uses this cable guide.

Means to Solve the Problem

A cable guide according to the present disclosure includes a plurality of link frame bodies that are arranged in a row and are pivotably joined to each other, each of the link frame bodies including a pair of link plates that are spaced apart from and opposed to each other in an orthogonal direction that is orthogonal to an arrangement direction, a first plate portion that joins together end portions of the pair of link plates on one side in a height direction, and a second plate portion that joins together end portions on another side in the height direction, at least one of two side edge portions of the first plate portion is provided with a notch portion due to which the width of the first plate portion is smaller in a central portion in the orthogonal direction thereof than two end portions in the orthogonal direction of the first plate portion, the cable guide is capable of bending on the first plate portion side, and the side edge portion of the first plate portion in which the notch portion is provided extends curved in an arc shape.

The wire harness apparatus according to the present disclosure includes the cable guide and a wire harness that is housed in the cable guide.

Effect of the Invention

According to the present disclosure, it is possible to provide a cable guide that can reduce contact pressure of a wire harness acting on the cable guide without increasing the size of the cable guide, and a wire harness apparatus that uses this cable guide.

DETAILED DESCRIPTION TO EXECUTE THE INVENTION

Description of Embodiments of Present Disclosure

Figure 1:
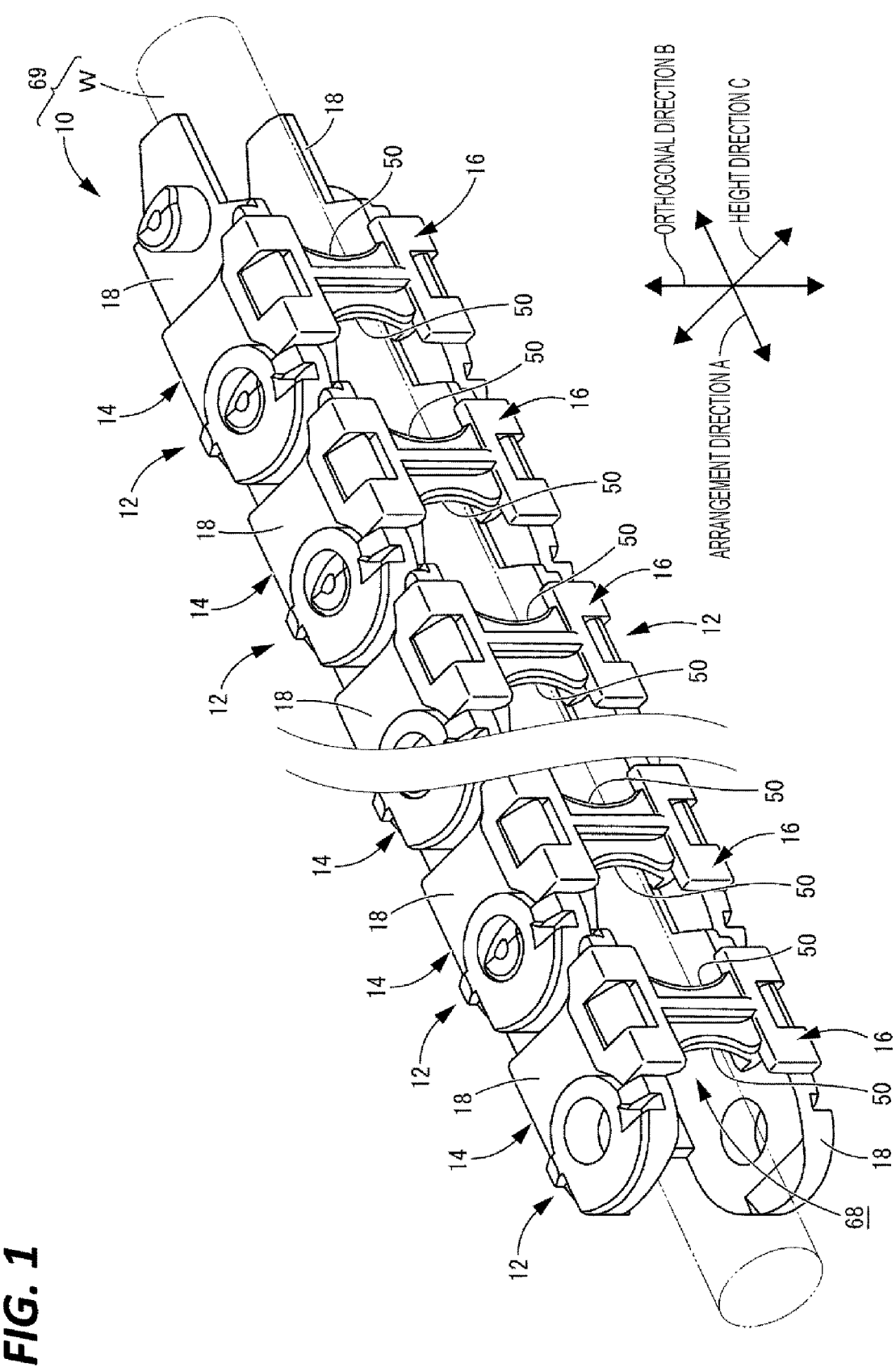
FIG. 1 is a perspective view illustrating a representative configuration example of a cable guide according to a first embodiment.

Firstly, embodiments of the present disclosure will be listed and described.

A cable guide according to the present disclosure is (1) a cable guide that includes: a plurality of link frame bodies that are arranged in a row and are pivotably joined to each other, each of the link frame bodies including a pair of link plates that are spaced apart from and opposed to each other in an orthogonal direction that is orthogonal to an arrangement direction, a first plate portion that joins together end portions of the pair of link plates on one side in a height direction, and a second plate portion that joins together end portions on another side in the height direction, at least one of two side edge portions of the first plate portion is provided with a notch portion due to which the width of the first plate portion is smaller in a central portion in the orthogonal direction thereof than two end portions in the orthogonal direction of the first plate, the cable guide is capable of bending on the first plate portion side, and the side edge portion of the first plate portion in which the notch portion is provided extends curved in an arc shape.

In the cable guide according to the present disclosure, a notch portion is provided in at least one of two side edge portions of the first plate portion that joins together a pair of link plates of each link frame body. The width of the first plate portion (the size of the first plate portion in the arrangement direction of the link frame body) is smaller in a central portion in the orthogonal direction that is orthogonal to the arrangement direction than in two end portions. Therefore, when the cable guide bends as the movable body moves, the notch portion allows a large displacement amount of the wire harness that is displaced on the first plate portion side. As a result, it is possible to reduce the contact pressure of the wire harness on the first plate portion and the bending angle of the wire harness when the cable guide is bent, and to improve the flex resistance of electric wires that constitute the wire harness. Also, a notch portion only needs to be provided in the first plate portion, and thus the cable guide according to the present disclosure can be realized by making a minor change to the design and mold of an existing cable guide.

In particular, the notch portion is not provided such that the width of the first plate portion is made smaller over the entire length thereof in the orthogonal direction that is orthogonal to the arrangement direction of each link frame body, but rather the notch portion is provided such that a central portion in the orthogonal direction of the first plate portion is made smaller. Accordingly, the width of the central portion of the first plate portion at which contact pressure of the wire harness is likely to be high is made smaller compared to the two end portions, the wire harness being likely to have wires bound into a circular cross-section. Accordingly, the contact pressure is efficiently reduced at a region where the contact pressure of the wire harness is likely to be high, while ensuring the strength of the first plate portion itself and the joining strength of the pair of link plates joined together by the first plate portion. The side edge portion of the first plate portion that is pressed against the wire harness can be provided in the form of a smooth shape that has no bending point while having the notch portion. As a result, generation of a region in the first plate portion that is locally pressed against the wire harness is avoided, and a risk of the wire harness breaking is further advantageously reduced.

(2) The notch portion is preferably provided in both of the two side edge portions of the first plate portion. The contact pressure of the wire harness acting on the first plate portion as the cable guide bends is further advantageously reduced, and it is possible to improve the durability of the wire harness.

(4) In the above-described cable guide according to (1) or (2), it is preferable that, in the side edge portion of the first plate portion in which the notch portion is provided, a straight portion is provided in a central portion in the orthogonal direction of the first plate portion, and a pair of tapered portions that gradually protrude outward in the arrangement direction from two end portions of the straight portion toward two ends in the orthogonal direction of the first plate portion are provided. The central portion of the side edge portion of the first plate portion at which contact pressure of the wire harness is likely to be high can be configured as a straight portion at which the width of the first plate portion is small and that has no bent portion. As a result, generation of a region where the first plate portion is locally pressed against the wire harness is prevented. In addition, the joining strength of the first plate portion to the link plate can be stably ensured due to the pair of tapered portions.

(5) It is preferable that the first plate portion is detachably joined to at least one of the end portions of the pair of link plates on the one side. It is possible to form an opening portion in the link frame body by removing the first plate portion from the link plates. Accordingly, it is possible to insert the wire harness into the cable guide from opening portions that are continuous in the arrangement direction of link frame bodies, and to simplify an operation of covering the wire harness with the cable guide.

(6) It is preferable that the first plate portion is a separate portion from the pair of link plates, and a lock mechanism for detachably joining the two end portions in the orthogonal direction of the first plate portion to the pair of link plates is provided. Even when the width of the first plate portion is reduced by providing notch portions in the two side edge portions of the first plate portion, for example, the joining strength of the first plate portion and the pair of link plates can be sufficiently ensured in the two end portions in the orthogonal direction of the first plate portion.

(7) In the side edge portion of the first plate portion in which the notch portion is provided, an edge on a bottom surface side opposed to the second plate portion is preferably chamfered. In the side edge portion of the first plate portion, the edge on the bottom surface side that the wire harness is pressed against has a shape that includes a plurality of obtuse angles or a smooth shape that has no corners. As a result, when the cable guide is bent, stress that acts on the wire harness due to pressing against the first plate portion is distributed, and damage to the wire harness can be prevented.

A wire harness apparatus according to the present disclosure is (8) a wire harness apparatus that includes the cable guide according to at least one of (1), (2), and (4) to (7), and a wire harness housed in the cable guide.

With the wire harness apparatus according to the present disclosure, in a wire harness apparatus in which the wire harness is housed in the cable guide, it is possible to achieve effects of the cable guide disclosed in at least one of (1), (2), and (4) to (7).

Specific examples of a cable guide according to the present disclosure will be described below with reference to the drawings. Note that the present disclosure is not limited to these examples and is defined by the scope of the claims, and all modifications that are equivalent to or within the scope of the claims are included.

First Embodiment

Figure 2:
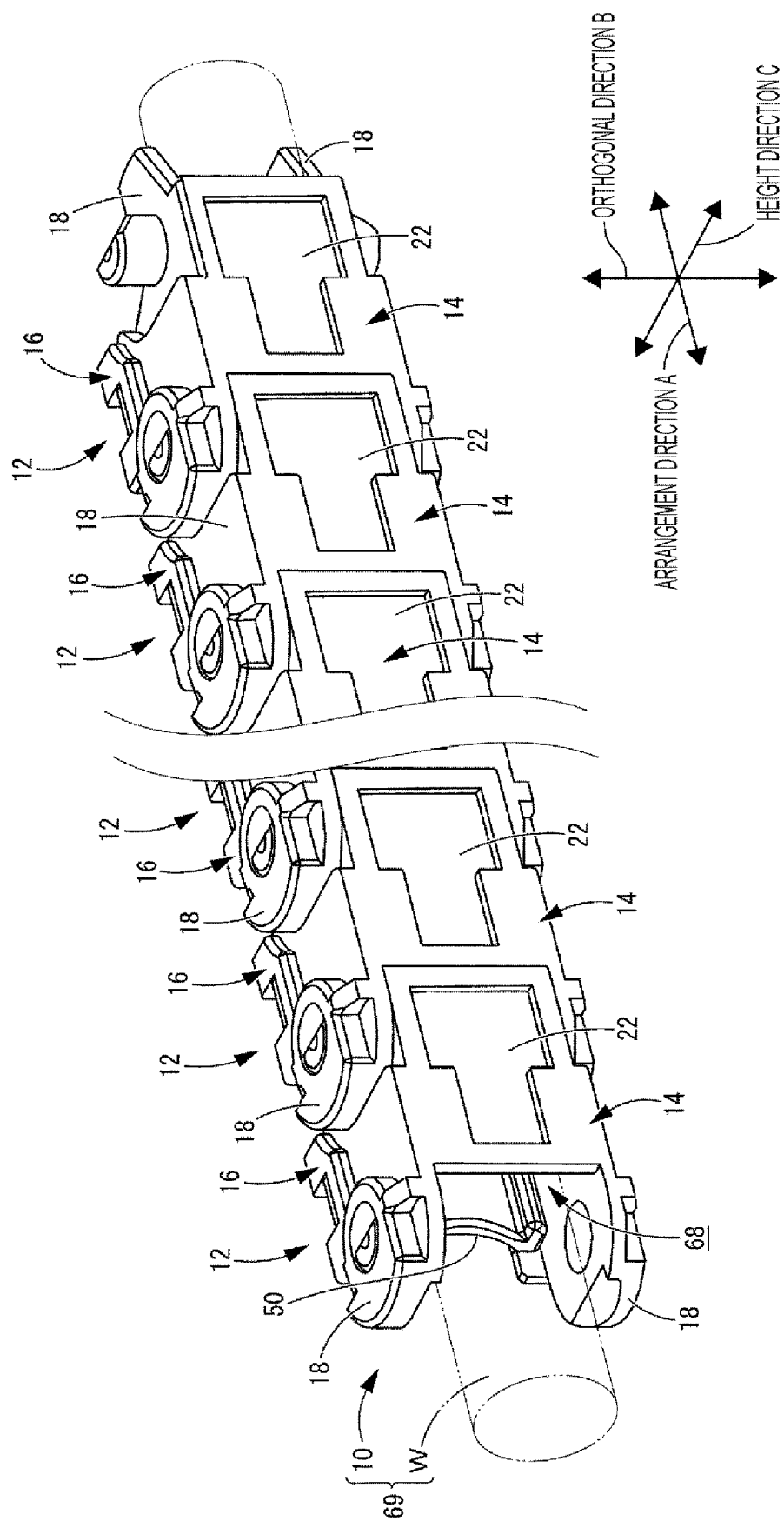
FIG. 2 is a perspective view showing the cable guide in FIG. 1 from a different angle.
Figure 3:
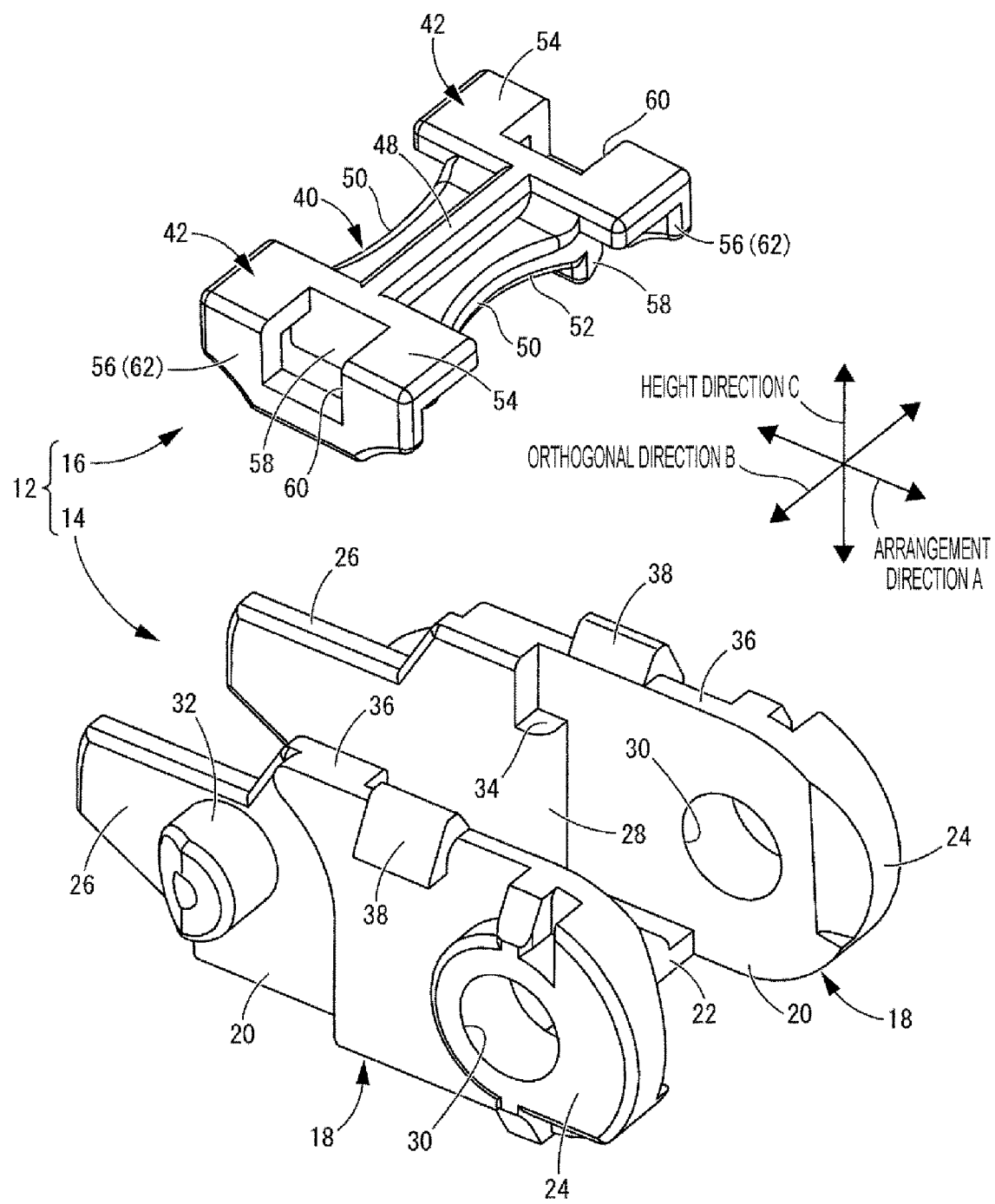
FIG. 3 is an exploded perspective view of a link frame body constituting the cable guide in FIG. 1.

As shown in FIGS. 1 and 2, a cable guide 10 has a structure in which a plurality of link frame bodies 12 arranged in a row are pivotably joined together. The cable guide 10 extends by a predetermined length in an arrangement direction A of the plurality of link frame bodies 12. Additionally, the cable guide 10 can be used covering a wire harness W that extends between a vehicle body and a movable body such as a sliding door, which are not illustrated. Each link frame body 12 is constituted by a base body 14 and a first plate portion 16 as shown in FIG. 3.

The base body 14 is an injection-molded piece made of a synthetic resin such as polypropylene or polyamide. The base body 14 has an overall groove-like shape. The base body 14 includes, in an integral manner, a pair of link plates 18 arranged opposing each other in an orthogonal direction B that is orthogonal to the arrangement direction A and a second plate portion 22 that joins base end portions 20 of these link plates 18 to each other.

Each link plate 18 has a first plate 24 disposed on one side in the arrangement direction A in which the plurality of link frame bodies 12 are arranged and a second plate 26 disposed on the other side. The first plate 24 and the second plate 26 extend misaligned from each other in the orthogonal direction B, which is the thickness direction thereof, and are integrally coupled to each other. The link plate 18 constituted by the first plate 24 and the second plate 26 has an offset structure in which a step portion 28 is formed in the coupling portion between the first plate 24 and the second plate 26.

In the link plate 18, the first plate 24 is positioned more outward in the orthogonal direction B than the second plate 26. The internal surface of the first plate 24 extends on the same plane as the outer surface of the second plate 26.

A joining pin hole 30 that extends through the first plate 24 in the orthogonal direction B is formed in the first plate 24. The first plate 24 is thick in a portion around the opening of the joining pin hole 30, ensuring rigidity to resist deformation at the opening portion of the joining pin hole 30. The joining pin hole 30 is not limited to a through-hole and may be a recess with a closed outer opening, for example. A joining pin 32 that protrudes outward in the orthogonal direction B is formed in the second plate 26. The inner circumferential surface of the joining pin hole 30 and the outer circumferential surface of the joining pin 32 have a corresponding circular cross-sectional shape.

Supporting portions 34 are formed on the inner surfaces in the opposing direction of the pair of link plates 18. Accordingly, as a result of the second plates 26 being offset inward of the first plates 24, step portions 28 are formed on the inner surfaces in the opposing direction of the pair of link plates 18. As a result of a notch being formed in each step portion 28, the supporting portion 34, which has a step-like shape, is formed.

A lock catch 38 is integrally formed with a leading end portion 36 of each link plate 18. The lock catch 38 protrudes outward in the orthogonal direction B from the link plate 18. An inclined face that is inclined toward the base end portion 20 outward in the orthogonal direction B is formed on both sides in the orthogonal direction B of the lock catch 38. The surface on the base end portion 20 side of the lock catch 38 is a flat engagement surface.

The base end portions 20 of a pair of link plates 18 are joined together by the second plate portion 22, which has a plate-like shape. The second plate portion 22 is formed integrally with the pair of link plates 18.

Figure 4:
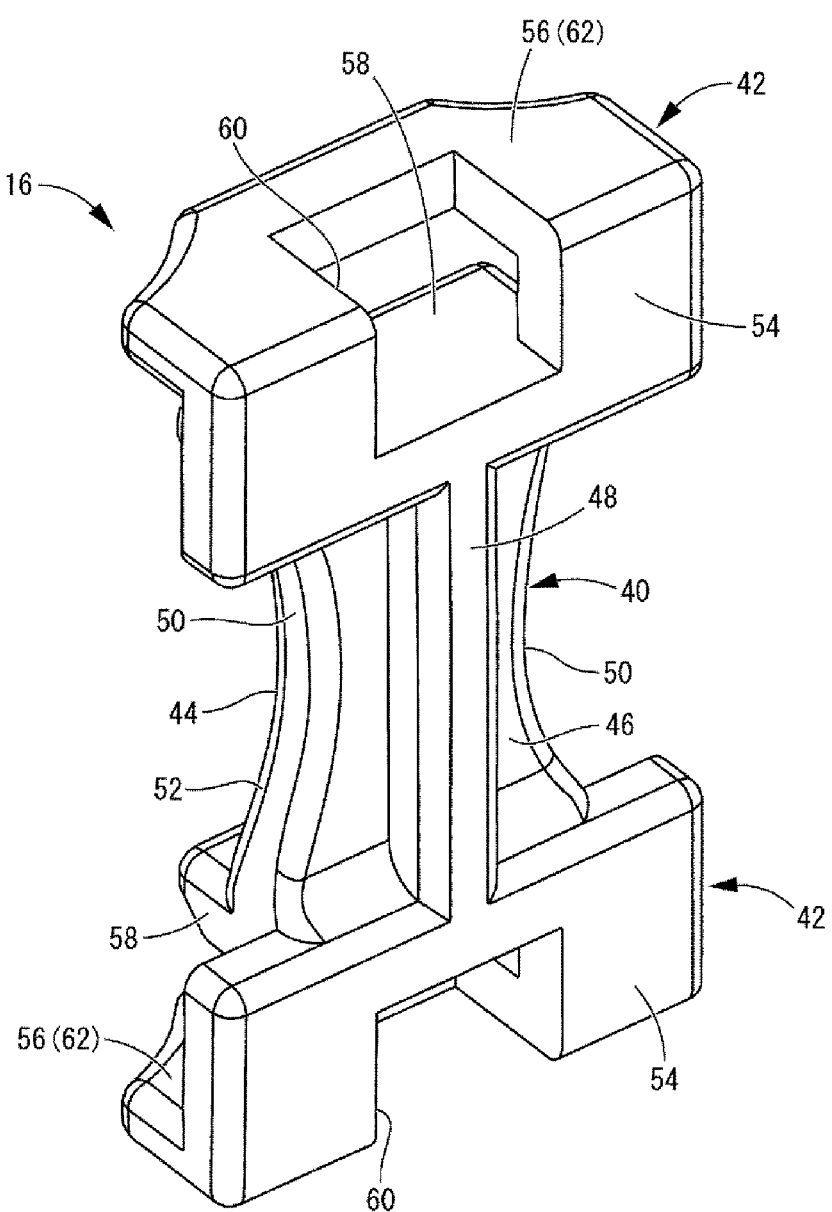
FIG. 4 is a perspective view of a first plate portion constituting the link frame body shown in FIG. 3.
Figure 5:
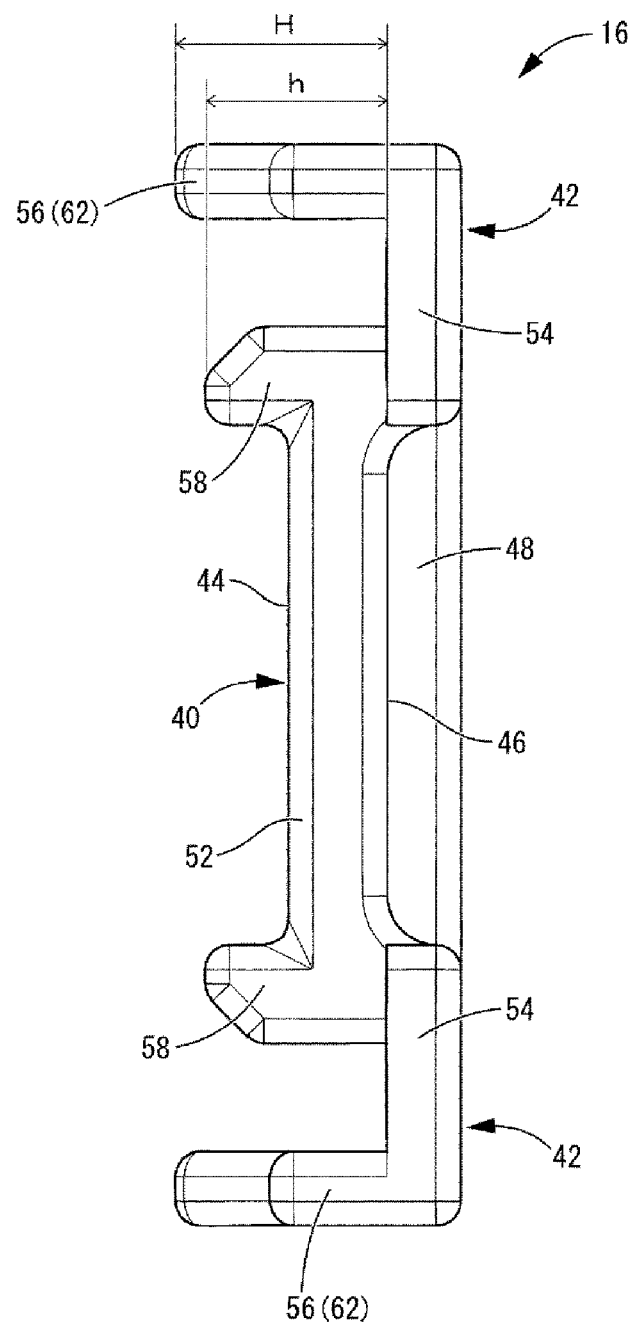
FIG. 5 is a front elevational view in which the first plate portion in FIG. 4 is enlarged.

The first plate portion 16 is an injection-molded piece made of a synthetic resin such as polypropylene or polyamide. As shown in FIGS. 4 and 5, the first plate portion 16 has a plate-like shape, and has a structure in which joining portions 42 are provided on two sides of a cover wall portion 40. A front surface that is a later-described top surface 46 side of the first plate portion 16 and a back surface that is a later-described bottom surface 44 side differ in shape. The first plate portion 16 is a separate component independent of the base body 14. The first plate portion 16 may be formed of the same material as the base body 14, or may be formed of a material different from the material of the base body 14. For example, as a result of the first plate portion 16, which is smaller than the base body 14, being formed of a higher-strength material, the durability thereof is improved, and as a result of using a high-strength material in a limited manner, an increase in cost can be reduced.

The cover wall portion 40 has a plate-like shape elongated in the orthogonal direction B. The bottom surface 44 of the cover wall portion 40 that opposes the second plate portion 22 is a flat surface. A reinforcement rib 48 protruding from the top surface 46 is integrally formed in a central portion of the cover wall portion 40 in the arrangement direction A. The reinforcement rib 48 is a ridge that linearly extends in the orthogonal direction B. The thickness of two edge portions of the cover wall portion 40 in the arrangement direction A, not including the reinforcement rib 48, is smaller than the thickness of a central portion in which the reinforcement rib 48 is formed. Since the reinforcement rib 48 is formed in a central portion of the cover wall portion 40, a reinforcing effect can be achieved in a balanced manner using the one reinforcement rib 48. The reinforcement rib 48 is provided in a continuous manner so as to extend between the pair of joining portions 42.

Notch portions 50 are respectively provided in two side edge portions in the arrangement direction A of the cover wall portion 40. The two side edge portions in the arrangement direction A of the cover wall portion 40 have an arc-like curved shape as a result of the notch portions 50 being provided. Accordingly, the width of a central portion in the orthogonal direction B of the cover wall portion 40 is smaller than the width in the arrangement direction A of the two end portions. It is desirable that the notch portions 50 are symmetrical with respect to the center in the orthogonal direction B of the cover wall portion 40, but may be asymmetric. Particularly, the cross-section area of the central portion in the orthogonal direction B of the cover wall portion 40 is made small as a result of the notch portions 50 being formed, but sufficient deformation rigidity is ensured as a result of the reinforcement rib 48 being provided.

In two side edge portions of the cover wall portion 40 in which the notch portions 50 are provided, edges on the bottom surface 44 side of the cover wall portion 40 are chamfered, and chamfered portions 52 are formed. As a result of the chamfered portions 52 being provided, sharp corners of the two side edge portions of the cover wall portion 40 are removed, and edges of the two side edge portions of the cover wall portion 40 are each formed by a flat surface or a curved surface. Each chamfered portion 52 of this aspect has a curved surface, and is smoothly continuous with the top surface 46 or the bottom surface 44 and the side surface of the cover wall portion 40 without any bending point.

Each joining portion 42 has a top wall 54 that extends in parallel with the cover wall portion 40. An outer wall 56 that protrudes from an outer end portion in the orthogonal direction B and an inner wall 58 that protrudes from an inner end portion in the orthogonal direction B are formed in the top wall 54.

The outer wall 56 has a plate-like shape that extends orthogonally to the top wall 54. A base end portion of the outer wall 56 that is connected to the top wall 54 protrudes by a certain width. The width of the leading end portion of the outer wall 56 gradually decreases toward a protruding leading end thereof.

A lock insertion hole 60 is formed in the top wall 54 and the outer wall 56. In central portions in the arrangement direction A of the top wall 54 and the outer wall 56, the lock insertion hole 60 is formed to span the outer end portion in the orthogonal direction B of the top wall 54 and the base end portion of the outer wall 56. Accordingly, in a portion where the lock insertion hole 60 is formed, the cross sections of the top wall 54 and the outer wall 56 are reduced by an amount that corresponds to the lock insertion hole 60, and the bending rigidity of the top wall 54 and the outer wall 56 is decreased. As a result of the lock insertion hole 60 being formed in the outer wall 56, the outer wall 56 forms a U-shaped lock frame 62 that is open toward the top wall 54 side.

The inner wall 58 has a plate-like shape that extends in parallel with the outer wall 56, and is spaced apart from the outer wall 56 inwardly in the orthogonal direction B and opposes the outer wall 56. The inner wall 58 protrudes from the top wall 54 by a certain width. The outer surface of the protruding leading end portion of the inner wall 58 is inclined inwardly toward the leading end, and the inner wall 58 is thinner in the orthogonal direction B toward the protruding leading end. The inner wall 58 is positioned on the inner side in the orthogonal direction B relative to the opening portion of the lock insertion hole 60 in the top wall 54.

Figure 6:
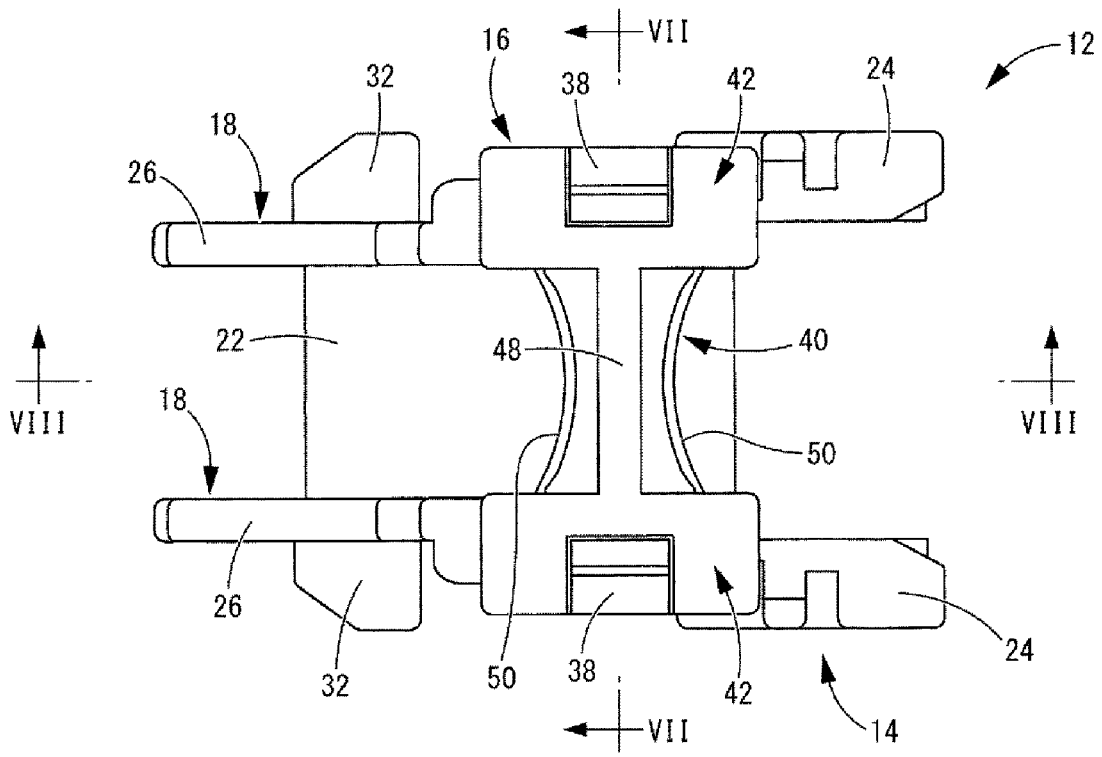
FIG. 6 is a right side view of the link frame body shown in FIG. 3.
Figure 7:
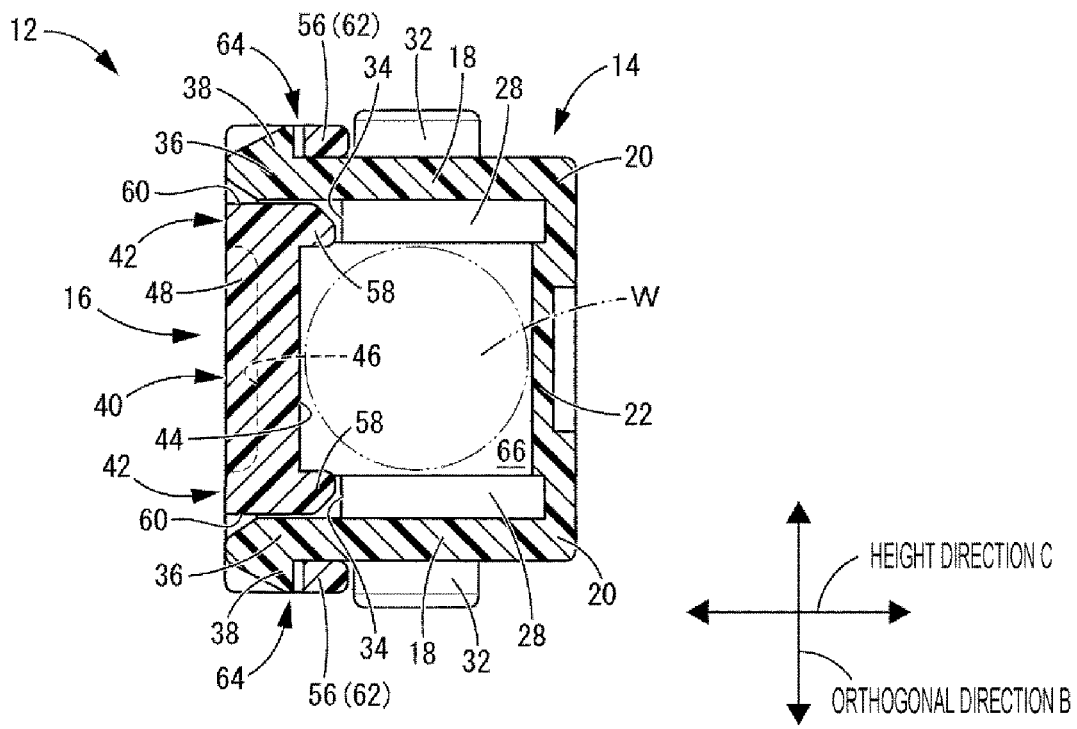
FIG. 7 is a cross-sectional view taken along VII-VII in FIG. 6.

As shown in FIGS. 6 and 7, the first plate portion 16 is attached to the base body 14. Specifically, each leading end portion 36 of the link plates 18 of the base body 14 is disposed so as to be inserted between the outer wall 56 and the inner wall 58 of the corresponding joining portion 42, which oppose each other. The lock frame 62 of the outer wall 56 then moves over the lock catch 38 of the link plate 18, and the lock catch 38 is inserted into the lock insertion hole 60. Accordingly, as a result of the lock catch 38 and the lock frame 62 engaging with each other, separation of the base body 14 and the first plate portion 16 is restricted, thus configuring lock mechanisms 64 for joining together the pair of link plates 18 of the base body 14 and the first plate portion 16. In the lock mechanisms 64, the lock catches 38 are disposed in a state of being housed without protruding from the lock insertion holes 60, and thus space-saving lock mechanisms 64 are formed, and unintended unlocking due to the action of an external force is unlikely to occur.

The first plate portion 16 has a shape that is symmetrical with respect to a plane that extends orthogonally to the arrangement direction A at the center in the arrangement direction A, and is symmetrical with respect to a plane that extends orthogonally to the orthogonal direction B at the center in the orthogonal direction B. Therefore, in work for attaching the first plate portion 16 to the base body 14, it suffices for only the orientation of the front and back sides of the first plate portion 16 to be appropriate for the base body 14. For example, even when the first plate portion 16, whose orientation of the front and back sides is proper, is pivoted with respect to the base body 14 by 180°, the first plate portion 16 can be properly attached to the base body 14. Thus, during work of attaching the first plate portion 16, directional restriction for mounting the base body 14 to the first plate portion 16 is mitigated, and the first plate portion 16 can be easily attached to the base body 14.

Since the outer surface of the protruding leading end portion of the inner wall 58 is inclined inwardly toward the protruding leading end, the leading end portion 36 of the link plate 18 is likely to be guided between the inner wall 58 and the outer wall 56. The two surfaces in the orthogonal direction B of the lock catch 38 are inclined surfaces, and the lock catch 38 is thinner toward the first plate portion 16 side in the orthogonal direction B. Accordingly, the lock catch 38 is likely to be guided between the inner wall 58 and the outer wall 56. The lock frame 62 constituted by the outer wall 56 of the joining portion 42 and the lock catch 38 that protrudes outward from the leading end portion 36 of the link plate 18 in the orthogonal direction B constitute the compact lock mechanism 64. Accordingly, a large volume of an internal space 66 of the link frame body 12, which will be described later, is secured.

The lock mechanism 64 detachably joins the base body 14 and the first plate portion 16 together. In a state where the base body 14 and the first plate portion 16 are joined together by the lock mechanisms 64, the outer walls 56 and the top walls 54 can be caused to deflect and deform by applying an external force to the first plate portion 16. Accordingly, engagement of the lock catches 38 with the leading end portions of the outer walls 56 is released, and the first plate portion 16 can be removed from the base body 14.

Since the lock frame 62 is formed by the outer wall 56 of the joining portion 42 in which the lock insertion hole 60 is formed, rigidity against bending and deformation of the lock frame 62 is reduced. Therefore, the lock frame 62 can easily move over the lock catch 38 while elastically deflecting, and work for joining together the first plate portion 16 and the link plates 18 is made easy.

In the joining portion 42, the lock insertion hole 60 is formed so as to extend through not only the outer wall 56 but also the top wall 54. Accordingly, deformation rigidity against bending of the top wall 54 is also reduced, and the lock frame 62 can easily move over the lock catch 38 due to elastic deformation of the top wall 54 as well. In the top wall 54, the lock insertion hole 60 is open between the outer wall 56 and the inner wall 58, and thus, regarding molding of the first plate portion 16, it is possible to simplify the structure of a mold.

As a result of the first plate portion 16 being attached to the link plates 18 of the base body 14, the cover wall portion 40 of the first plate portion 16 is disposed between the leading end portions 36 of the pair of link plates 18, and an opening that is open toward the base body 14 is covered by the first plate portion 16. Accordingly, each tubular link frame body 12 is constituted by the base body 14 and the first plate portion 16. As shown in FIGS. 6 and 7, the internal space 66 that extends through the link frame body 12 in the arrangement direction A is formed in the link frame body 12.

The outer walls 56 and the inner walls 58 of the first plate portion 16 are disposed so as to respectively sandwich the leading end portions 36 in a state of overlapping the leading end portions 36 of the link plates 18, and are joined to the leading end portions 36. Accordingly, the leading end portions 36 of the link plates 18 are reinforced by the outer walls 56 and the inner walls 58, and deformation rigidity at the coupling portions between the first plate portion 16 and the base body 14 are improved.

The inner walls 58 of the first plate portion 16 overlap and are supported by the supporting portions 34 of the link plates 18, respectively. Accordingly, each of the joining portions 42 of the first plate portion 16 and the link plate 18 are positioned relative to each other in the direction in which the inner wall 58 protrudes. For example, even when the first plate portion 16 deforms or is displaced relative to the base body 14 under the action of a load, deformation and displacement of the first plate portion 16 are restricted since the inner walls 58 of the first plate portion 16 are supported by the supporting portions 34. Accordingly, damage that is caused by excessive deformation of the first plate portion 16 is prevented, and damage to the wire harness W that is caused by the first plate portion 16 being pressed against the wire harness W is avoided.

As shown in FIG. 5, a height h that is the protrusion length of the inner wall 58 from the top wall 54 is smaller than a height H that is the protrusion length of the outer wall 56 from the top wall 54. Accordingly, the reinforcing effect of the link plate 18 by the outer wall 56 can be exerted over a broad area while preventing the internal space 66 from being reduced due to the inner wall 58.

As shown in FIGS. 1 and 2, a plurality of link frame bodies 12 are arranged in the arrangement direction A and are pivotably joined together. Specifically, the joining pins 32 of one of two link frame bodies 12 adjacent in the arrangement direction A are respectively inserted into the joining pin holes 30 of the other link frame body 12. Accordingly, the link frame bodies 12 adjacent in the arrangement direction A are joined together in a form allowing for pivoting with respect to the joining pins 32 in a predetermined angle range. The cable guide 10 is configured by pivotably joining together a plurality of link frame bodies 12 in this manner. Note that the number of link frame bodies 12 that constitute the cable guide 10 is not particularly limited.

One end portion in the arrangement direction A of the inner surface of the link plate 18 and the other end portion in the arrangement direction A of the leading end surface of the joining pin 32 have inclined faces corresponding to each other. Accordingly, the joining pin 32 is easily inserted into the first plate 24 from one side in the arrangement direction A, and work for inserting the joining pin 32 into the joining pin hole 30 is made easy.

The cable guide 10 can bend at the joining portion between link frame bodies 12 adjacent in the arrangement direction A. The angle range over which a plurality of link frame bodies 12 can pivot is determined by an end portion of the second plate 26 of one link frame body 12 coming into contact with the step portion 28 of the second plate 26 of the other link frame body 12, for example. Bending of the cable guide 10 may be allowed only on one of the first plate portion 16 side and the second plate portion 22 side, or may be allowed on both the first plate portion 16 side and the second plate portion 22 side.

Figure 8:
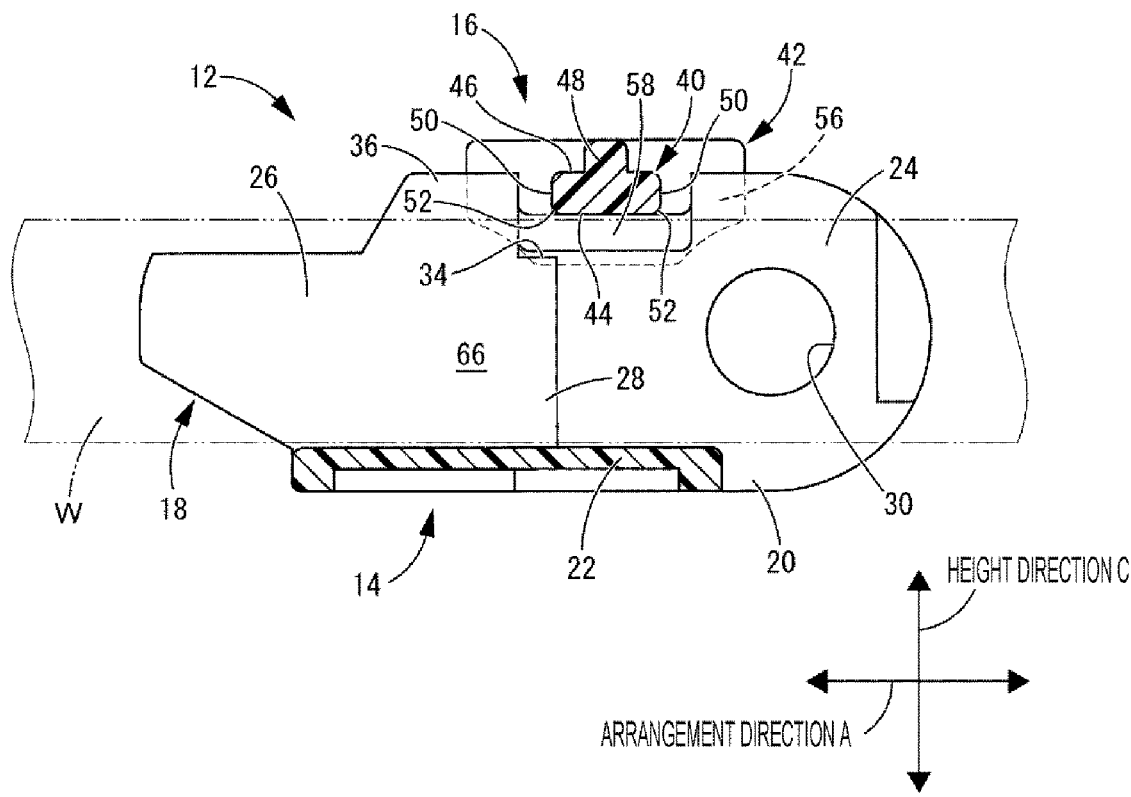
FIG. 8 is a cross-sectional view taken along VIII-VIII in FIG. 6.

As shown in FIG. 8, in the first plate portion 16, the width (length in the arrangement direction A) of the inner walls 58 is smaller than the width (length in the arrangement direction A) of the outer walls 56. Accordingly, when link frame bodies 12 joined together pivot, the inner walls 58 of one link frame body 12 are unlikely to interfere with the link plates 18 of another link frame body 12, and these link frame bodies 12 are allowed to pivot over a larger angle. Since a large width is secured for each outer wall 56, it is possible to reinforce the link plate 18 using the outer walls 56 over a wide range.

Figure 9:
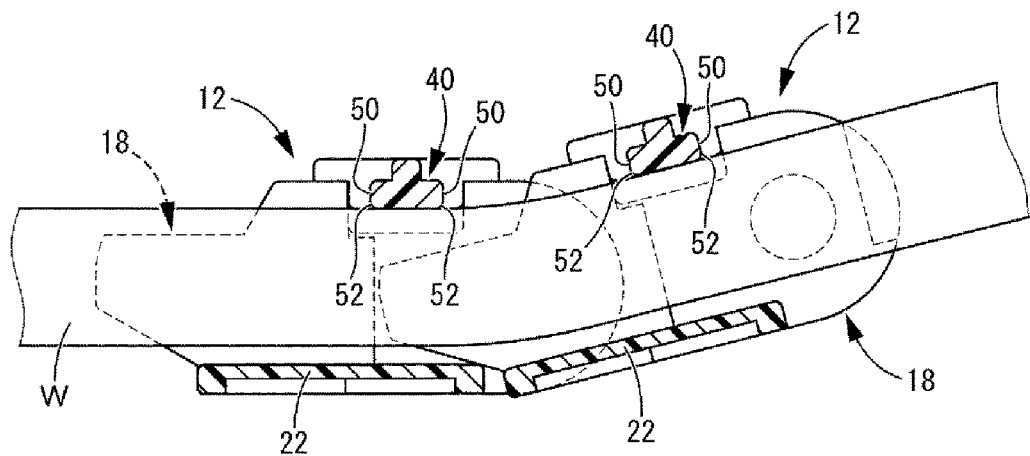
FIG. 9 is a cross-sectional view illustrating a bending state of the cable guide shown in FIG. 1.

The wire harness W is inserted into the cable guide 10. The wire harness W is, for example, configured by binding a plurality of electric wires using a binding member such as a tube or band, and extends to be elongated with a substantially circular cross-section. As a matter of course, as seen from the fact that the wire harness W is formed by binding a plurality of electric wires, the wire harness W does not need to have a precise circular cross-section. In the cable guide 10, an insertion path 68 in which the internal spaces 66 of the link frame bodies 12 are continuous in the arrangement direction A is formed, and the wire harness W is disposed in this insertion path 68. Accordingly, the surrounding region of the wire harness W is protected by the cable guide 10, and, as shown in FIG. 9, curving and deformation of the wire harness W is allowed by bending of the cable guide 10. Note that a plurality of electric wires that constitute the wire harness W do not need to be bound using a binding member.

Since each of the bottom surfaces 44 of the first plate portions 16 that form a wall surface of the insertion path 68 is a flat surface, when the wire harness W housed in the insertion path 68 hits the bottom surface 44, concentration of stress due to unevenness of the bottom surface 44 is avoided, and the durability of the wire harness W is improved.

Since the wire harness W has an overall circular outer shape, when the cable guide 10 is bent, the wire harness W inserted into the insertion path 68 of the cable guide 10 is likely to be closest to a central portion in the orthogonal direction B of the cover wall portion 40 of a first plate portion 16. In view of this, in each first plate portion 16, as shown in FIGS. 4 and 6, the notch portions 50 are provided in the side edge portions of the cover wall portion 40 such that the width in the arrangement direction A of the cover wall portion 40 is smaller in the central portion in the orthogonal direction B than two end portions in the orthogonal direction B. Accordingly, when the cable guide 10 is bent, the wire harness W is unlikely to interfere with the side edge portions of the cover wall portion 40, and even when the wire harness W comes into contact with the cover wall portion 40, pressure that is caused by the contact is reduced. As a result, damage to the wire harness W caused by pressure acting on the cover wall portion 40 is avoided, and damage such as breaking of the wire harness W is avoided.

Since the notch portions 50 are provided in two side edge portions of the cover wall portion 40 instead of only one side of the cover wall portion 40, the wire harness W is unlikely to interfere with the cover wall portion 40, and it is possible to prevent a load caused by contact with the cover wall portion 40 from acting on the wire harness W in a concentrated manner.

The first plate portion 16 is a portion separate from the base body 14, and the joining portions 42 at the two ends thereof are joined to the pair of link plates 18 of the base body 14. Therefore, even if the width of a portion of the cover wall portion 40 that does not include the joining portions 42 is reduced by providing the notch portions 50, it is possible to ensure sufficiently high joining strength of the first plate portion 16 to the pair of link plates 18.

The notch portions 50 extend in the orthogonal direction B and are curved in an arc-like shape, and the surfaces of the notch portions 50 have a smooth shape that does not have any bending point in the orthogonal direction B. Accordingly, when the wire harness W comes into contact with the side edge portions of the cover wall portion 40 that includes the notch portions 50, breaking of the wire harness W and the like is avoided.

It is possible to reduce the contact pressure of the wire harness W that acts on the first plate portion 16 simply by providing the notch portions 50 in the side edge portions of the cover wall portion 40 of the first plate portion 16. Thus, it is possible to easily realize the cable guide 10 according to the present disclosure without significantly changing the design and mold of an existing cable guide 10. In addition, a pair of link plates 18 and a second plate portion 22 of the cable guide 10 according to the present disclosure can also be configured as a pair of link plates and a second plate portion of an existing cable guide. In short, the cable guide 10 can be realized by base bodies 14 that are common with existing cable guides and first plate portions 16 obtained by slightly changing those of an existing cable guide.

As shown in FIGS. 4 and 5, in the side edge portions of the cover wall portion 40 in which the notch portions 50 are provided, the chamfered portions 52 chamfering sharp corners are provided. Accordingly, even when the wire harness W comes into contact with the cover wall portion 40, it is possible to prevent a sharp corner of the cover wall portion 40 from being pressed against the wire harness W and biting into the wire harness W. Therefore, it is possible to prevent a load due to pressure on the cover wall portion 40 from locally acting on the wire harness W, and to avoid breaking and the like of the wire harness W. In particular, since the cross sections of the chamfered portions 52 have a shape that is curved and smooth without a corner formed by ridge line portions of the cover wall portion 40, a load is prevented from acting on the wire harness W in a concentrated manner, the durability and reliability of the wire harness W are improved.

The wire harness W that is inserted into the cable guide 10 is disposed between the pairs of link plates 18 of the base bodies 14, before the first plate portions 16 are attached to the base bodies 14. In a state where the link plates 18 of a plurality of the base bodies 14 are joined together, for example, the wire harness W is disposed between the opposing link plates 18 of the base bodies 14, and, after that, the first plate portions 16 are attached to the link plates 18 of each of the base bodies 14. Accordingly, in the cable guide 10, the wire harness W can be inserted into the insertion path 68 from the opening portions of the base bodies 14 that are continuous in the arrangement direction A that is the length direction of the cable guide 10. Therefore, work for inserting the wire harness W in the arrangement direction A from one end portion of the cable guide 10 to the other end portion is made unnecessary, and work for inserting the wire harness W into the cable guide 10 is made easy. Therefore, there is no need to insert a terminal provided at an end portion of the wire harness W inside the cable guide 10, and thus the cable guide 10 can cover the wire harness W without damaging the terminal of the wire harness W.

When the first plate portion 16 is joined to the base body 14, the inner walls 58 of the first plate portion 16 are moved so as to slide while being kept in proximity to the inner surfaces of the link plates 18 of the base body 14. Accordingly, the wire harness W does not get wedged between a link plate 18 and an inner wall 58, thus damage to the wire harness W is avoided, and work for attaching the first plate portion 16 to the base body 14 is simplified.

The lock mechanisms 64 are respectively provided between the link plates 18 of the base body 14 and the outer walls 56 of the first plate portion 16, and thus the lock mechanisms 64 do not interfere with the wire harness W.

Each of the joining portions 42 of the first plate portion 16 joined to the pair of link plates 18 of the base body 14 has a double-walled structure in which the outer wall 56 and the inner wall 58 are provided, and the leading end portion 36 of the link plate 18 is inserted between the outer wall 56 and the inner wall 58. Therefore, even when a load acts on the link frame body 12 in the orthogonal direction B that is the direction in which the pair of link plates 18 oppose each other, the load bearing performance of the link frame body 12 is sufficiently ensured since the link plates 18 are reinforced by the joining portions 42 that each have the double-walled structure.

Specifically, for example, when the cable guide 10 covers the wire harness W that couples the vehicle body and electrical components of a sliding door, there is a risk that a load in the orthogonal direction B will act on the cable guide 10 when a person steps on the cable guide 10, for example. In this case, joining portions of the link plates 18 to the first plate portion 16 are reinforced by the outer walls 56 and the inner walls 58 of the first plate portion 16, and the bending rigidity of the first plate portion 16 is reinforced by the reinforcement rib 48. Accordingly, deformation of and damage to the link frame body 12 are avoided, and thus the wire harness W is stably protected by the cable guide 10 from a load acting thereon from outside, and a decrease in the durability and damage of the wire harness W is avoided.

Note that, when the cable guide 10 is used in a vehicle, there is no particular limitation thereto, but, for example, the cable guide extends between a mobile object that may be a sliding door and the vehicle body such that the orthogonal direction B in drawings is the up-down direction. Assembly of the cable guide 10 and the wire harness W housed in the cable guide 10 may be referred to as a wire harness apparatus 69.

Second Embodiment

Figure 10:
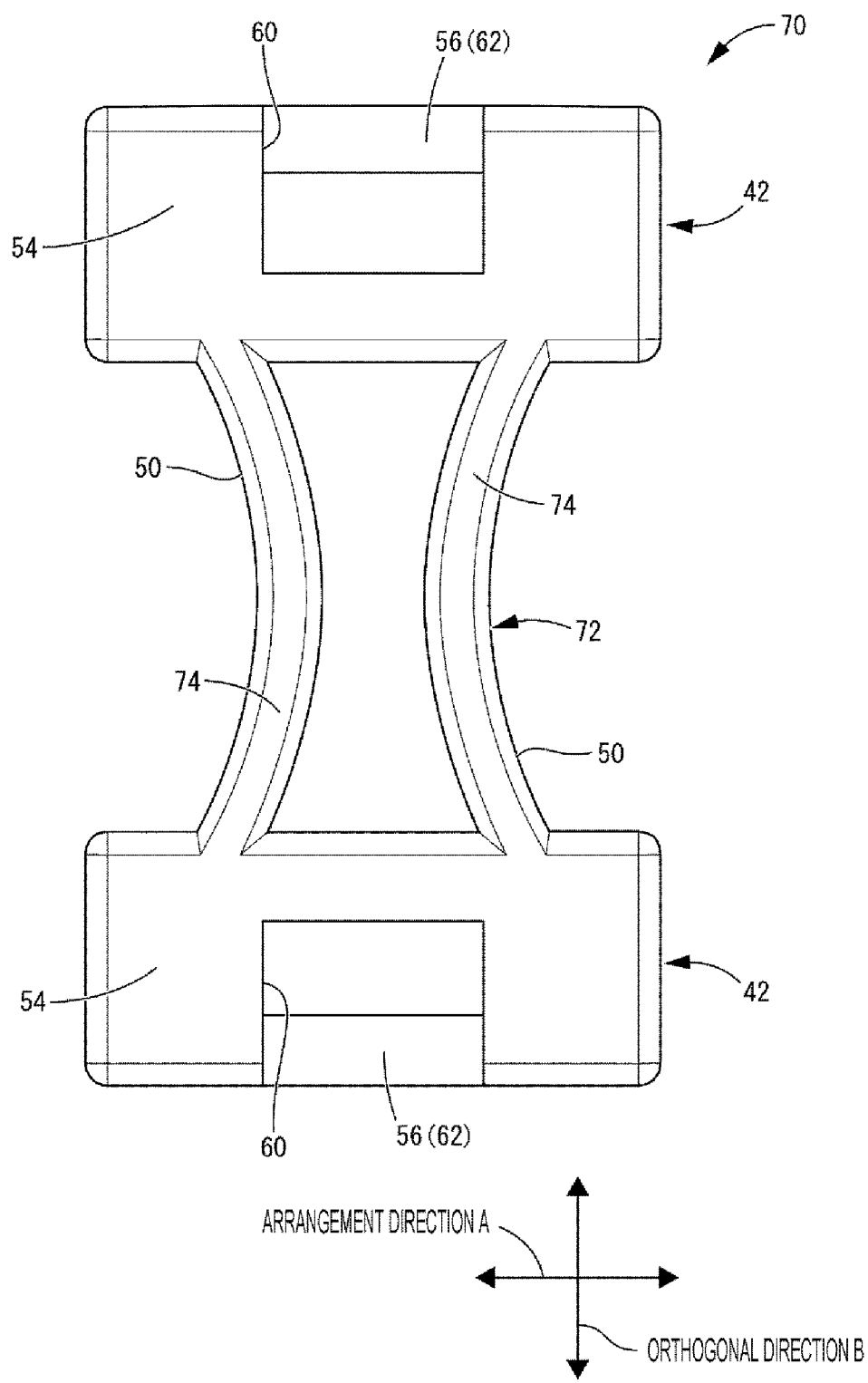
FIG. 10 is a right side view illustrating a representative configuration example of a first plate portion according to a second embodiment.

FIG. 10 shows a first plate portion 70 that is a constituent element of another specific example of the cable guide according to the present disclosure. In the following description, members and regions that are substantially the same as those of the cable guide 10 shown in FIG. 1 are given the same reference numerals in drawings and a description thereof may be omitted.

In the first plate portion 70, reinforcement ribs 74 that protrude outward in the thickness direction of a cover wall portion 72 (on the front side in FIG. 10) are respectively formed in two edge portions in the arrangement direction A that is the right-left direction in FIG. 10. Accordingly, the two edge portions in the arrangement direction A of the cover wall portion 72 are thicker than a central portion in the arrangement direction A.

The two edge portions of the cover wall portion 72 are likely to come into contact with the wire harness when the cable guide is bent, and thus, as a result of the reinforcement ribs 74 being provided in the two edge portions of the cover wall portion 72, even when a force acts on the two edge portions of the cover wall portion 72 from the wire harness in a concentrated manner, sufficient durability can be achieved.

Third Embodiment

Figure 11:
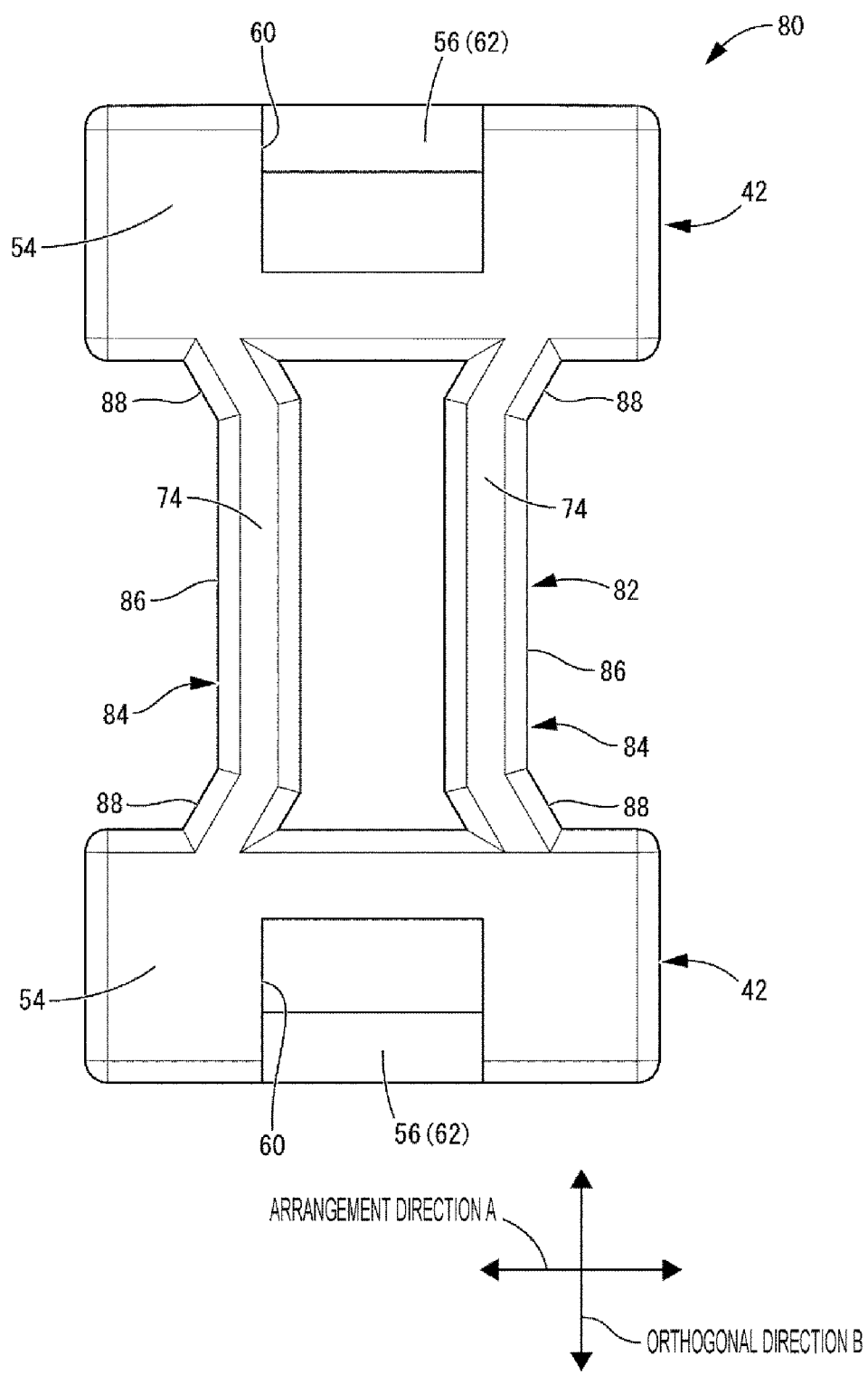
FIG. 11 is a right side view illustrating a representative configuration example of a first plate portion according to a third embodiment.

FIG. 11 shows a first plate portion 80 that is a constituent element of another specific example of the cable guide according to the present disclosure. Notch portions 84 are provided in two edge portions in the arrangement direction A (the right-left direction in FIG. 11) of a cover wall portion 82 of the first plate portion 80. Straight portions 86 are provided in central portions in the orthogonal direction B (in FIG. 11, the up-down direction) of the notch portions 84. Each of the notch portions 84 includes a pair of tapered portions 88 that gradually protrude outward in the arrangement direction A from two end portions of the straight portion 86 toward the two edges in the orthogonal direction B. A central portion in the orthogonal direction B of the cover wall portion 82 has a substantially fixed width over a predetermined length in the orthogonal direction B as a result of the notch portions 84 being provided. Two end portions in the orthogonal direction B of the cover wall portion 82 have a width (length in the arrangement direction A) that is larger at a certain ratio outward in the orthogonal direction B as a result of the notch portions 84 being provided.

Thus, the notch portions 84 may have an angulated recessed shape when viewed in the height direction that is the direction in which the first plate portion 80 is viewed in FIG. 11, and side surfaces in the arrangement direction A of the cover wall portion 82 in which the notch portions 84 are provided may be formed by a plurality of surfaces. As a matter of course, for example, a central portion and two end portions in the orthogonal direction B may be formed by a combination of curved and flat surfaces.

Fourth Embodiment

Figure 12:
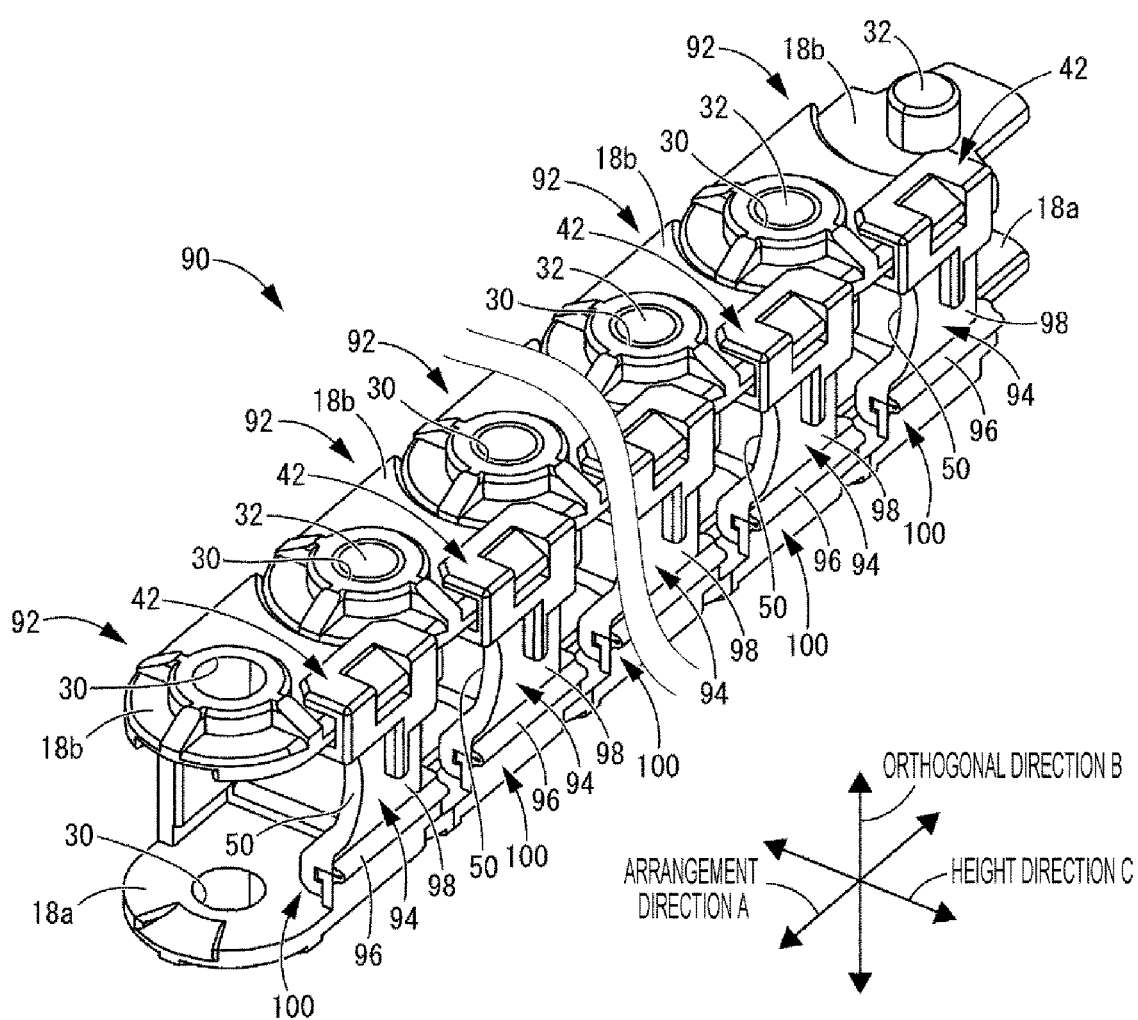
FIG. 12 is a perspective view illustrating a representative configuration example of a cable guide according to a fourth embodiment.

FIG. 12 shows another specific example of the cable guide according to the present disclosure. End portions on one side in the orthogonal direction B (the up-down direction in FIG. 12) of first plate portions 94 of a cable guide 90 are joined to groove-like base bodies 92 by hinge joining portions 96 that have a hinge-like shape. Each hinge joining portion 96 is thinner than the base body 92 and the first plate portion 94, and has flexibility that can allow relative displacement of the first plate portion 94 and the base body 92. One end portion in the orthogonal direction B of the first plate portion 94 has a structure in which the hinge joining portion 96 is provided in a cover wall portion 98, and no joining portion 42 is provided. The other end portion in the orthogonal direction B of the first plate portion 94 has the joining portion 42.

Figure 13:
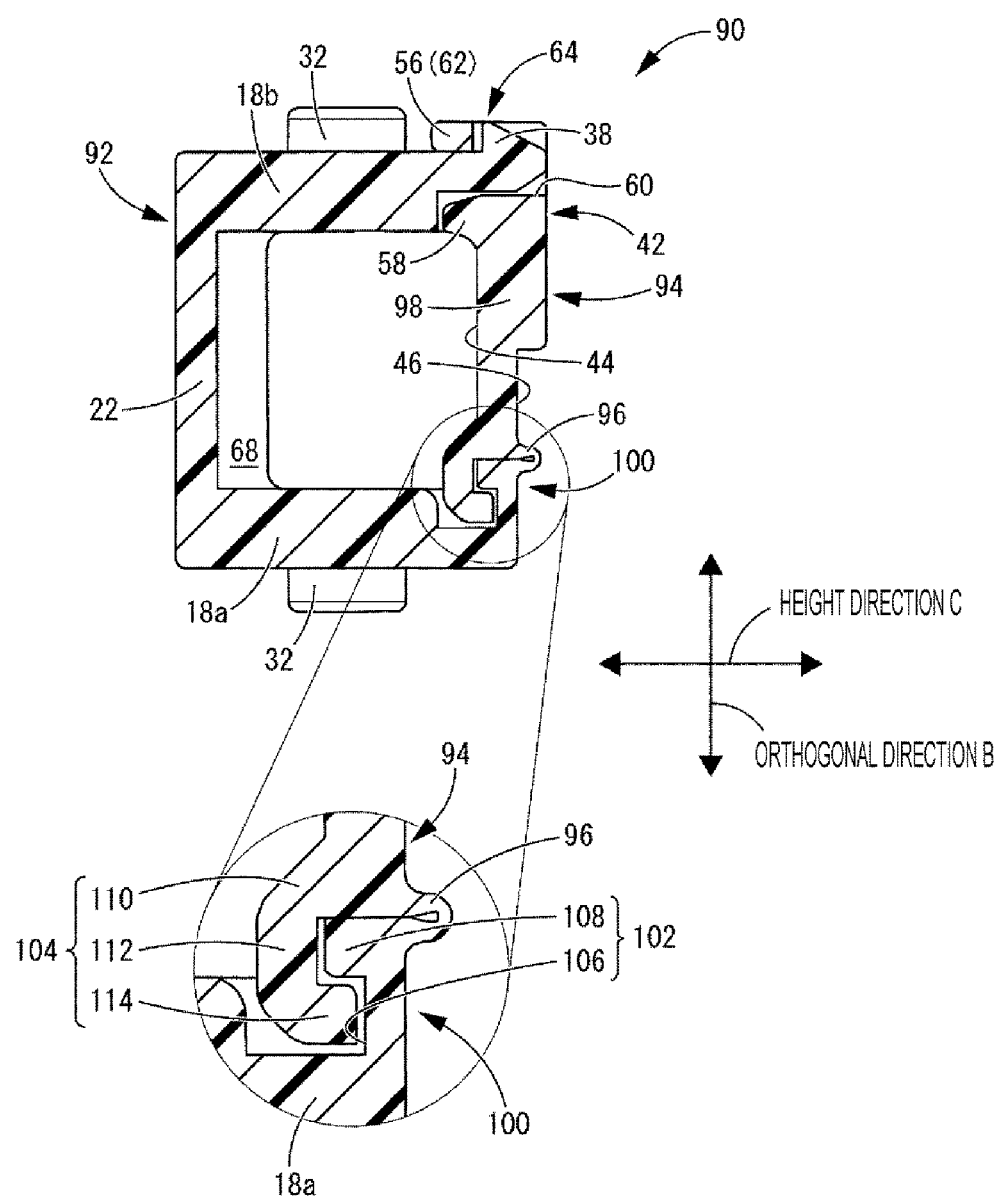
FIG. 13 is a cross-sectional view of the cable guide shown in FIG. 12.

End portions on the hinge joining portion 96 side of the base body 92 and the first plate portion 94 form a contact receiving portion 100. As shown in FIGS. 12 and 13, the contact receiving portion 100 is constituted by a base body contact portion 102 provided in the base body 92 and a cover body contact portion 104 provided in the first plate portion 94.

The base body contact portion 102 includes a recessed groove 106 of one link plate 18 that is open toward the inner surface of the other link plate 18 that is opposed thereto, and a protruding portion 108 that protrudes from the opening of the recessed groove 106 toward the second plate portion 22. Note that, in the following description, for convenience, one link plate 18 is referred to as a first link plate 18a, and another other link plate 18 is referred to as a second link plate 18b.

The cover body contact portion 104 includes a base portion 110 that protrudes from an end portion on the first link plate 18a side of the first plate portion 94 toward the second plate portion 22 side of the base body 92. The cover body contact portion 104 includes an intermediate portion 112 that extends from a protruding leading end of the base portion 110 toward the first link plate 18a side of the base body 92. The cover body contact portion 104 includes an end portion 114 that protrudes from the extending leading end of the intermediate portion 112 toward the top surface 46 side of the first plate portion 94 that is on the opposite side to the second plate portion 22 of the base body 92.

Moreover, in a state where the joining portion 42 of the first plate portion 94 is joined to the second link plate 18b of the base body 92 via the lock mechanism 64, the protruding portion 108 of the base body contact portion 102 overlaps the intermediate portion 112 of the cover body contact portion 104 in a height direction C. Furthermore, the end portion 114 of the cover body contact portion 104 is inserted into the recessed groove 106 of the base body contact portion 102, and the leading surface of the end portion 114 overlaps the inner surface of the side wall of the recessed groove 106.

Even when the wire harness W housed in the cable guide 90 is pressed against the first plate portion 94 by the above base body contact portion 102 and cover body contact portion 104, a load that acts on the hinge joining portion 96, which is thin, is decreased. That is to say, when the first plate portion 94 is pressed against the wire harness W and is about to be displaced relative to the base body 92 in a direction away from the second plate portion 22, the base body contact portion 102 and the cover body contact portion 104 come into contact with each other, and the displacement amount is limited to a sufficiently small amount. Accordingly, excessive deformation of the hinge joining portion 96 is prevented, and damage to the hinge joining portion 96 is avoided.

A notch portion 50 is provided in one side edge portion in the arrangement direction A of the cover wall portion 98 of the first plate portion 94. Thus, even in the cable guide 90 in which the base body 92 and the first plate portion 94 are integrated, when the wire harness W is pressed against the first plate portion 94, locally high pressure is avoided due to the notch portion 50, and damage to the wire harness W is avoided.

The notch portion 50 is provided only in one side edge portion of the cover wall portion 98, and the other side edge portion has a straight shape. Accordingly, a large size in the arrangement direction A of the hinge joining portion 96 provided in the end portion of the cover wall portion 98 is secured, and the durability of the hinge joining portion 96 is improved. As a matter of course, in a case where, for example, it is possible to sufficiently secure the length of the hinge joining portion 96, even in the first plate portion 94 joined to the first link plate 18a by the hinge joining portion 96, the notch portions 50 can be provided in both of the two side edge portions of the cover wall portion 98.

Fifth Embodiment

Figure 14:
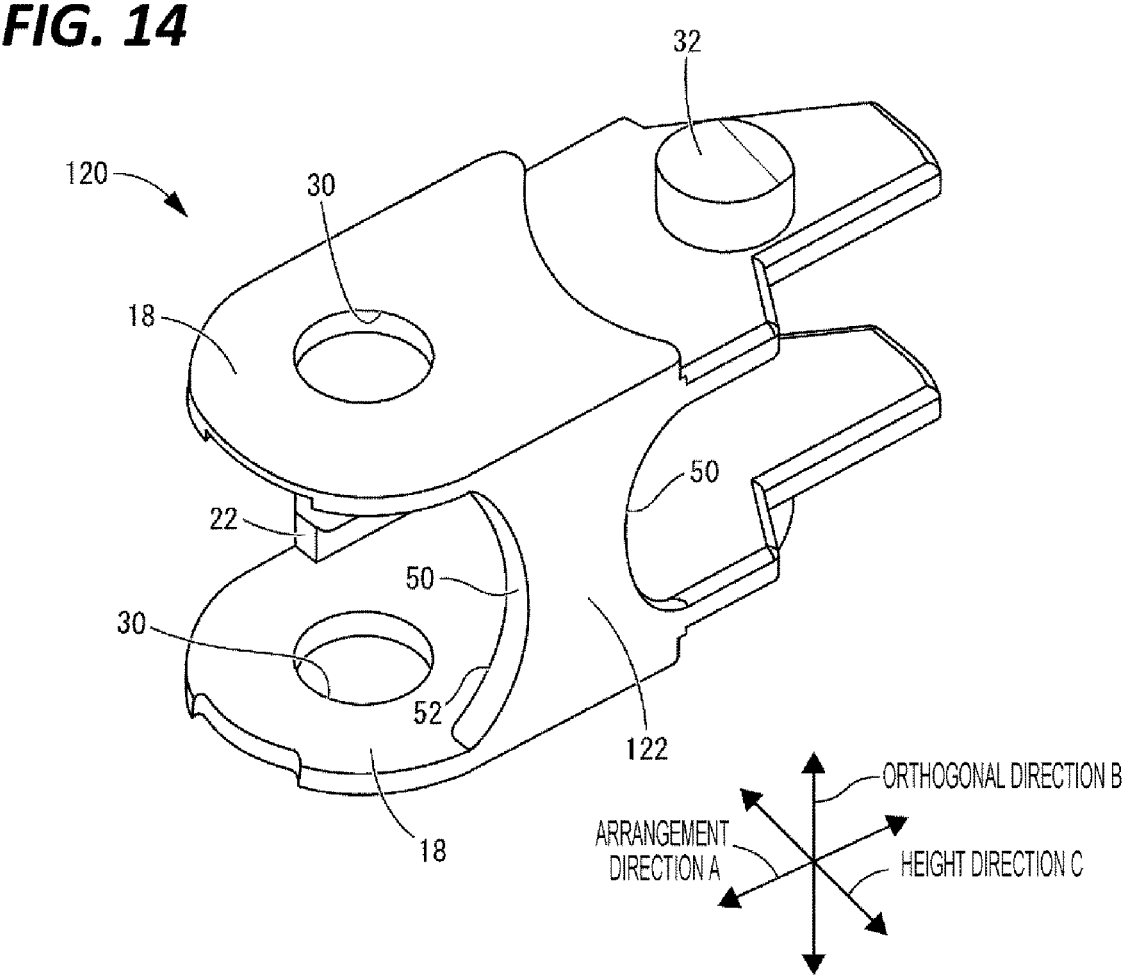
FIG. 14 is a perspective view illustrating a representative configuration example of a link frame body according to a fifth embodiment.
Figure 15:
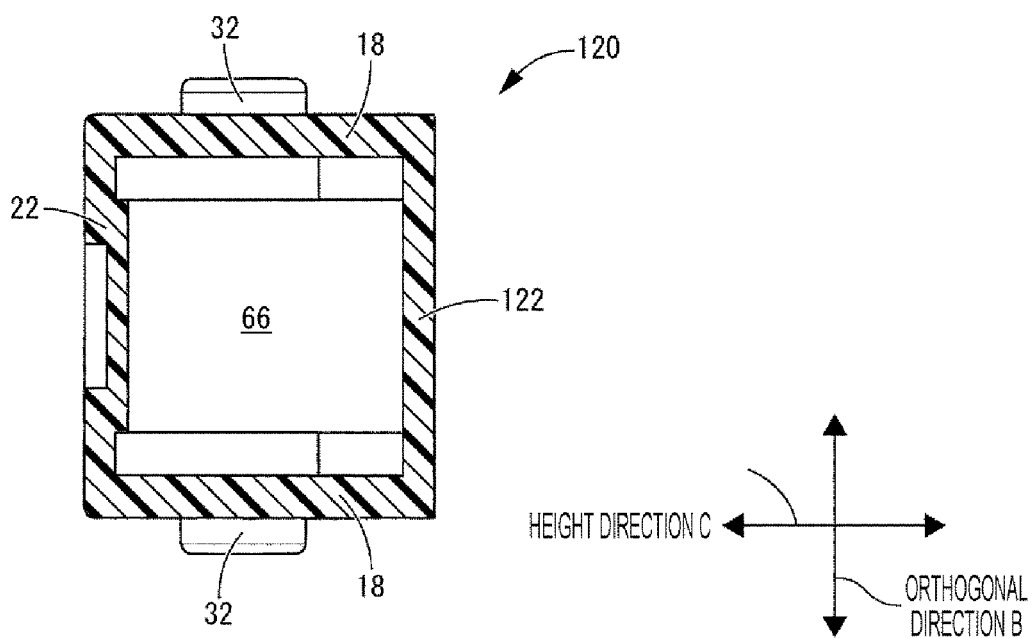
FIG. 15 is a cross-sectional view of the link frame body shown in FIG. 14.

FIG. 14 shows a link frame body 120 that is a constituent element of another specific example of the cable guide according to the present disclosure. As shown in FIG. 15, the link frame body 120 has a structure in which a pair of link plates 18, a first plate portion 122, and a second plate portion 22 are integrally formed. The first plate portion 122 has a flat plate-like shape, and, as shown in FIG. 14, notch portions 50 that have a curved shape are respectively formed in two side edge portions of the second plate portion 122 in the arrangement direction A.

Thus, in the cable guide according to the present disclosure, the first plate portion does not necessarily need to be a portion different from a pair of link plates, and the link frame body 120 may be formed to have a tubular shape in advance. Also in this case, as a result of the notch portions 50 being provided in the first plate portion 122, it is possible to reduce the contact pressure of the wire harness W that acts on the first plate portion 122.

As described above, a plurality of embodiments have been described in detail as specific examples according to the present disclosure, but the present disclosure is not limited to the description of these specific examples. Modifications, improvements, and the like within a range in which an object of the present disclosure can be achieved are included in the present disclosure.

The specific shape of a notch portion is not particularly limited as long as the width of a central portion in the orthogonal direction of a first plate portion is smaller than the width of each of two end portions thereof. Specifically, it is possible to adopt various shapes, for example, non-arc like curvatures such as V-like shapes, recessed shapes, parabolic shapes, and polygonal shapes that include three or more folding portions.

It is desirable that notch portions are provided over the entirety of the side edge portions of a portion of a first plate portion that is positioned between a pair of link plates, but notch portions may also be partially provided in a central portion in the orthogonal direction.

A notch portion that is similar to a notch portion provided in a side edge portion of the first plate portion can be provided in a side edge portion of the second plate portion. In particular, when the cable guide is bent not only on the first plate portion side but also on the second plate portion side, as a result of the notch portion being provided in the second plate portion, local pressing of the wire harness against the second plate portion is also avoided, and damage to the wire harness is prevented by reducing the contact pressure.

A configuration may also be adopted in which the first plate portion is formed integrally with the link plates and the second plate portion is a portion different from the link plates. Accordingly, it is possible to increase the degree of freedom of the shape of the second plate portion that is a component independent of the link plates while providing a notch portion in a side edge portion of the first plate portion, and to easily ensure the strength of the second plate portion that is a component separate from the link plates and the joining strength of the second plate portion to the link plates. Note that it is also possible to adopt a structure in which one end portion of the second plate portion is joined to the link plates using a thin hinge joining portion, and it is possible to increase the length of the hinge joining portion while providing a notch portion in a side edge portion of the first plate portion, and easily ensure the durability of hinge joining portion.

A configuration may also be adopted in which one link plate is formed integrally with the first plate portion and the second plate portion and the other link plate is a portion different from the one link plate, the first plate portion, and the second plate portion. In this case, the other link plate can be detachably joined to the first plate portion and the second plate portion, and an opening portion that enables the wire harness to be inserted into the cable guide from the side in a state where the other link plate is removed.

LIST OF REFERENCE NUMERALS 10, 90 Cable guide
12, 120 Link frame body
14, 92 Base body
16, 70, 80, 94, 122 First plate portion
18 Link plate
20 Base end portion
22 Second plate portion
24 First plate
26 Second plate
28 Step portion
30 Joining pin hole
32 Joining pin
34 Supporting portion
36 Leading end portion
38 Lock catch
40, 72, 82, 98 Cover wall portion
42 Joining portion
44 Bottom surface
46 Top surface
48, 74 Reinforcement rib
50, 84 Notch portion
52 Chamfered portion
54 Top wall
56 Outer wall
58 Inner wall
60 Lock insertion hole
62 Lock frame
64 Lock mechanism
66 Internal space
68 Insertion path
69 Wire harness apparatus
86 Straight portion
88 Tapered portion
96 Hinge joining portion
100 Contact receiving portion
102 Base body contact portion
104 Cover body contact portion
106 Recessed groove
108 Protruding portion
110 Base portion
112 Intermediate portion
114 End portion

What is claimed is:

1. A cable guide comprising:
   a plurality of link frame bodies that are arranged in a row and are pivotably joined to each other,
   wherein each of the link frame bodies includes:
      a pair of link plates that are spaced apart from and opposed to each other in an orthogonal direction that is orthogonal to an arrangement direction in which the plurality of link frame bodies are arranged in the row;

a first plate portion that joins together end portions of the pair of link plates provided at one side in a height direction that is orthogonal to both the orthogonal direction and the arrangement direction, each of both ends of the first plate portion including an inner wall and an outer wall that protrude downwardly in the height direction from a top wall of the first plate portion, respectively, and a width of the inner wall in the arrangement direction being smaller than that of the outer wall; and a second plate portion that joins together end portions of the pair of link plates provided at the other side in the height direction, wherein at least one of two side edge portions of the first plate portion is provided with a notch portion in which a width of the first plate portion is smaller in a central portion in the orthogonal direction thereof than two end portions in the orthogonal direction of the first plate portion, and wherein the cable guide is capable of bending on a side of the first plate portion, and the side edge portion of the first plate portion in which the notch portion is provided extends curved in an arc shape;

wherein a protrusion length of the inner wall from the top wall of the first plate portion in the height direction is shorter than that of the outer wall from the top wall of the first plate portion in the height direction.

2. The cable guide according to claim 1, wherein the notch portion is provided in both of the two side edge portions of the first plate portion.

3. The cable guide according to claim 1, wherein, in the side edge portion of the first plate portion in which the notch portion is provided, a straight portion is provided in a central portion in the orthogonal direction of the first plate portion, and a pair of tapered portions that gradually protrude outward in the arrangement direction from two end portions of the straight portion toward two ends in the orthogonal direction of the first plate portion are provided.

4. The cable guide according to claim 1, wherein the first plate portion is detachably joined to at least one of the end portions of the pair of link plates on the one side.

5. The cable guide according to claim 1, wherein the first plate portion is a separate portion from the pair of link plates, and a lock mechanism configured to detachably join the two end portions in the orthogonal direction of the first plate portion to the pair of link plates is provided.

6. The cable guide according to claim 1, wherein, in the side edge portion of the first plate portion in which the notch portion is provided, an edge on a bottom surface side opposed to the second plate portion is chamfered.

7. The cable guide according to claim 1, wherein the first plate portion includes an insertion through hole at each of both ends thereof, and each of the pair of link plates includes a lock catch that protrudes outwardly in the orthogonal direction from a top edge of each of the pair of link plates to be inserted into the insertion through hole of the first plate portion.

8. A wire harness apparatus comprising:
a cable guide including:
a plurality of link frame bodies that are arranged in a row and are pivotably joined to each other,
wherein each of the link frame bodies includes:
a pair of link plates that are spaced apart from and opposed to each other in an orthogonal direction that is orthogonal to an arrangement direction in which the plurality of link frame bodies are arranged in the row;
a first plate portion that joins together end portions of the pair of link plates provided at one side in a height direction that is orthogonal to both the orthogonal direction and the arrangement direction, each of both ends of the first plate portion including an inner wall and an outer wall that protrude downwardly in the height direction from a top wall of the first plate portion, respectively, and a width of the inner wall in the arrangement direction being smaller than that of the outer wall; and
a second plate portion that joins together end portions of the pair of link plates provided at the other side in the height direction, and
wherein at least one of two side edge portions of the first plate portion is provided with a notch portion in which a width of the first plate portion is smaller in a central portion in the orthogonal direction thereof than two end portions in the orthogonal direction of the first plate portion,
wherein the cable guide is capable of bending on a side of the first plate portion, and
the side edge portion of the first plate portion in which the notch portion is provided extends curved in an arc shape, and
a wire harness housed in the cable guide;
wherein a protrusion length of the inner wall from the top wall of the first plate portion in the height direction is shorter than that of the outer wall from the top wall of the first plate portion in the height direction.

9. The wire harness apparatus according to claim 8, wherein the first plate portion includes an insertion through hole at each of both ends thereof, and each of the pair of link plates includes a lock catch that protrudes outwardly in the orthogonal direction from a top edge of each of the pair of link plates to be inserted into the insertion through hole of the first plate portion.

* * * * *